March 21, 1950            E. PUGH            2,501,615
METHOD OF FORMING MAGNETIC FIELD PATTERNS
Filed March 7, 1946            3 Sheets-Sheet 1
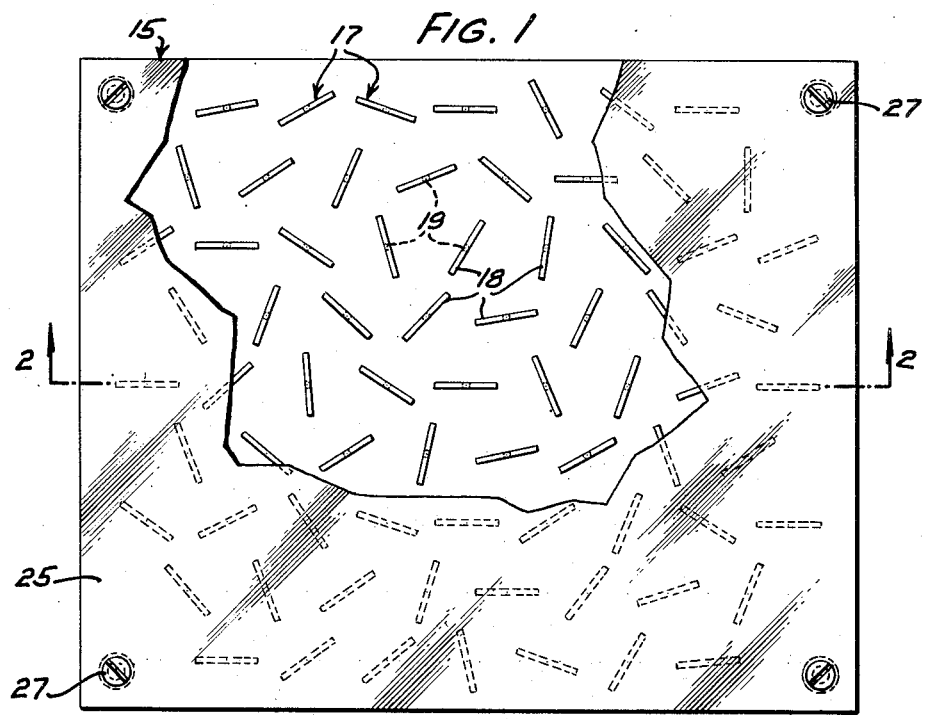
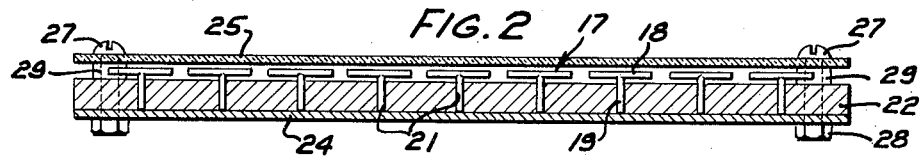
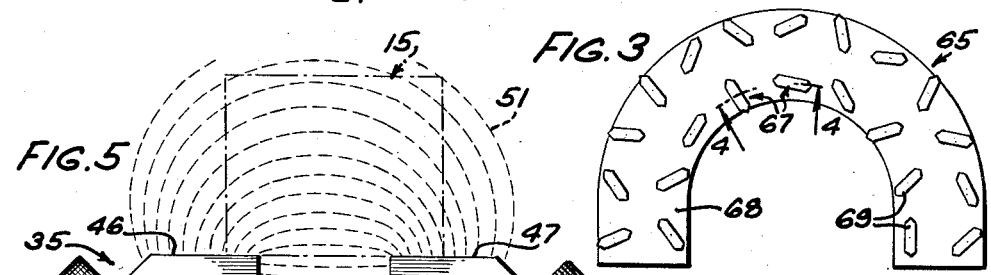
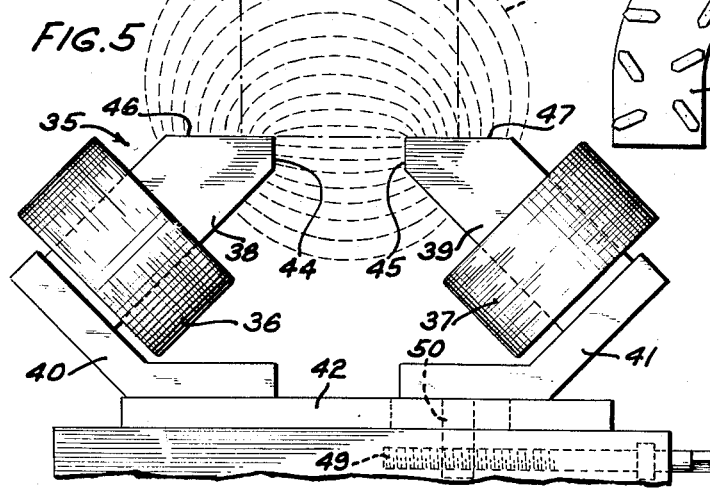
INVENTOR
E. PUGH
BY
ATTORNEY

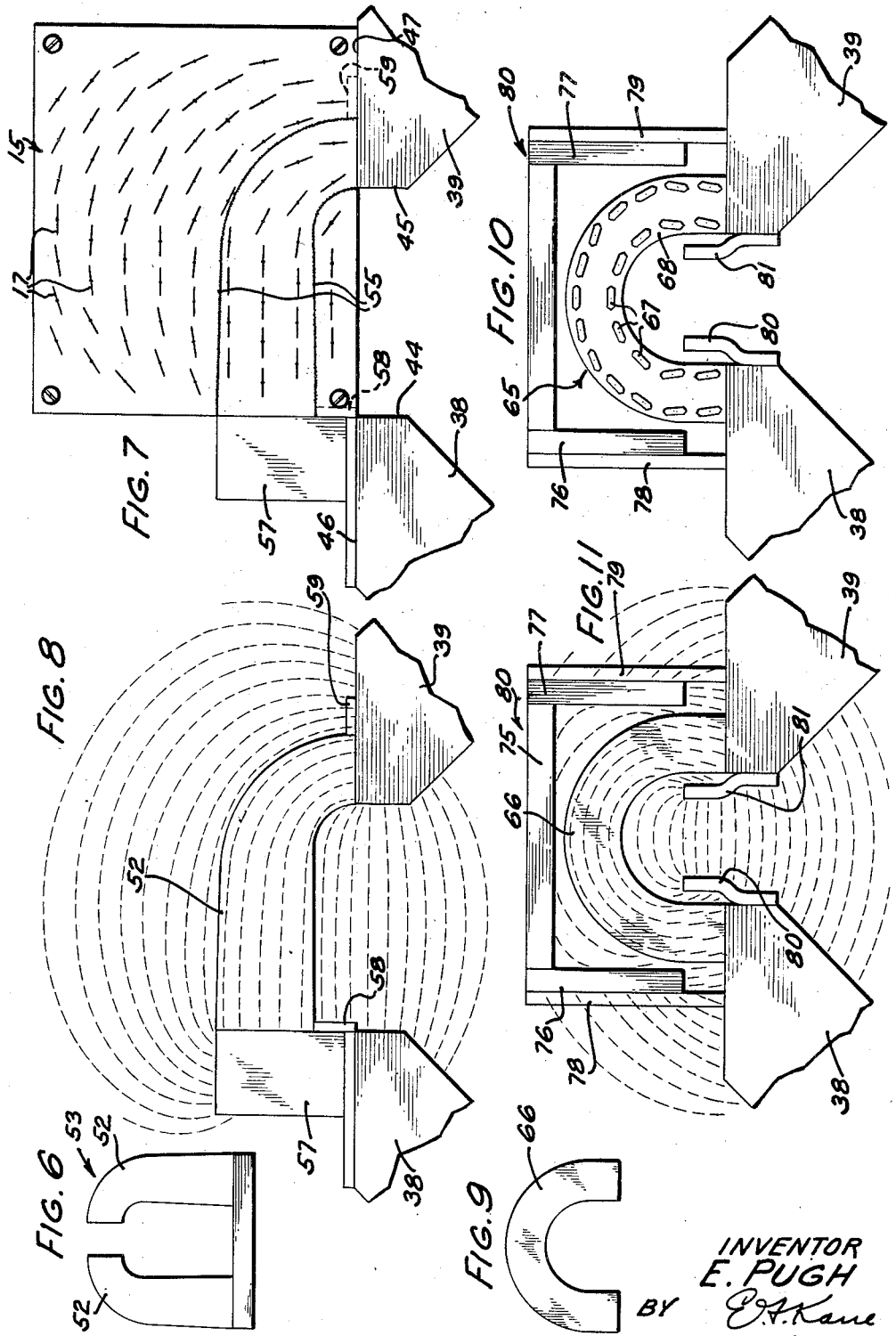

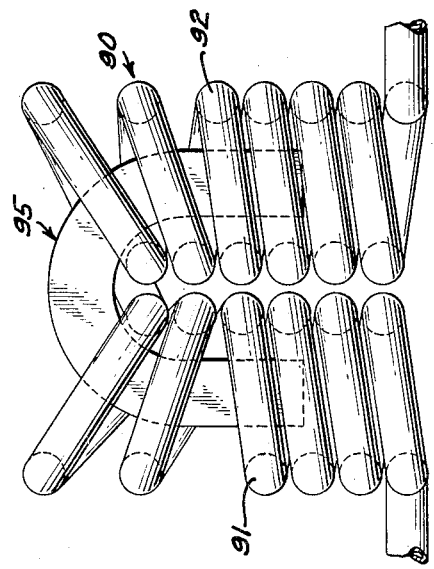
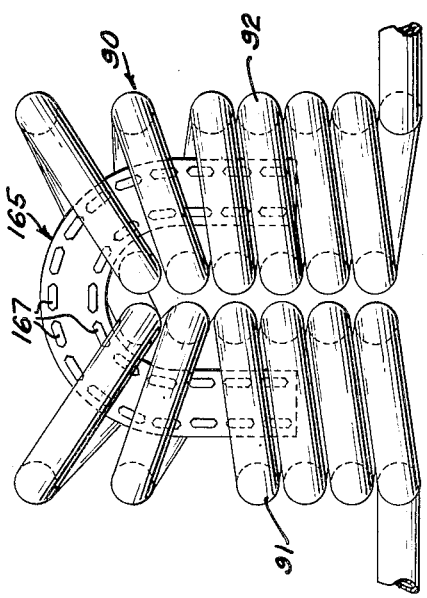

Patented Mar. 21, 1950

2,501,615

UNITED STATES PATENT OFFICE 2,501,615

METHOD OF FORMING MAGNETIC FIELD PATTERNS

Emerson Pugh, Downers Grove, Ill., assignor to Western Electric Company, Incorporated, New York, N. Y., a corporation of New York Application March 7, 1946, Serial No. 652,768

7 Claims. (Cl. 175—21)

This invention relates to a method for use in making magnetizing devices and more particularly to a method for use in designing magnetizing apparatus to have a predetermined flux pattern.

In processing permanent magnets made from magnetic alloys, it is the practice, with certain magnetic alloys, to heat the magnet to a temperature at which the part is non-magnetic, remove the part from the heat, and place it in a magnetic field to cool so as to subject the molecular structure thereof to the magnetic stress of the magnetizing field. It has been found that in order to obtain the maximum amount of the desirable magnetic properties in the permanent magnet being processed, it is essential that the flux pattern of the magnetic field duplicate the desired flux pattern of the permanent magnet when finally magnetized and in use.

Objects of the present invention are to provide a simple and effective method for use in making magnetizing devices having predetermined flux patterns.

In one embodiment of the invention illustrated herein, a bi-polar electromagnet is provided in which the pole cores are adjustable relative to each other to vary the magnetic field thereof. The normal flux pattern of the magnetic field formed adjacent the pole cores may be ascertained by a flux direction indicator and the pole cores of the electromagnet adjusted and/or magnetic members inserted into the magnetic field to change the flux pattern thereof to conform to the outline of the permanent magnet to be processed. The flux direction indicator may be in the form of a rectangular unit having the outline of the permanent magnet to be processed marked thereon or in the form of a unit having the same shape as the permanent magnet being processed and comprises a plurality of T-shaped members with the stems or pivot members of non-magnetic material and the cross members of magnetic material and which T-shaped members are spaced apart in a predetermined relation and mounted on their stems on a sheet of non-magnetic material to rotate freely so that when positioned in a magnetic field, they will align themselves with and indicate the direction of the lines of flux.

In another embodiment of the invention, the magnetizing field is produced by a hollow coil bent in the middle and folded on itself to form a double coil solenoid, into which a U-shaped flux direction indicator, simulating the magnet to be magnetized, may be inserted to indicate the flux pattern of the solenoid. The upper turns of the coils of the solenoid may then be deformed to direct a portion of the flux to conform to the shape of the rounded end portion of the magnet, as indicated by the flux direction indicator, the lower portion of the solenoid producing a flux pattern conforming to the straight portions of the legs of the magnet.

The invention will be more fully understood from the following detailed description when considered in connection with the accompanying drawings, in which the method and several embodiments of the apparatus have been illustrated, wherein Fig. 1 is a face view of one embodiment of a flux direction indicator;

Fig. 2 is a cross sectional view of the flux direction indicator, taken on the line 2—2 of Fig. 1;

Fig. 3 is a face view of another embodiment of a flux direction indicator;

Fig. 4 is a fragmentary sectional view taken on the line 4—4 of Fig. 3;

Fig. 5 is an elevational view of a bi-polar electromagnet used in processing permanent magnets;

Fig. 6 is an elevational view on a reduced scale of a permanent magnet unit having horn type poles;

Fig. 7 is an enlarged view of a portion of the electromagnet illustrated in Fig. 5 and showing the pole cores with an auxiliary pole piece added thereto and the flux direction indicator of the type shown in Figs. 1 and 2 in position thereon;

Fig. 8 is an enlarged view of a portion of the electromagnet showing the pole cores with the auxiliary pole piece added thereto and a horn type permanent magnet, of the kind used in the unit shown in Fig. 6, in position thereon;

Fig. 9 is an elevational view of a horseshoe type magnet;

Fig. 10 is a view of a portion of the electromagnet showing the pole cores with auxiliary pole pieces and magnetic flux shunting members added in the field thereof and showing a flux direction indicator of the type shown in Figs. 3 and 4 in position thereon;

Fig. 11 is a view similar to Fig. 10 showing the horseshoe type magnet in position in the magnetic field of the electromagnet;

Fig. 12 is an elevational view of a solenoid type of magnetizing device showing a U-shaped flux direction indicator mounted therein; and Fig. 13 is an elevational view of the solenoid type magnetizing device shown in Fig. 12 with a U-shaped permanent magnet mounted therein.

In setting up an effective and efficient magnetizing field in which a permanent magnet other than a straight bar magnet may be inserted to be magnetized, it is generally necessary to modify the magnetic field in order to have it conform to the outline of the permanent magnet to be processed. The flux pattern of the magnetic field may be ascertained by the insertion thereinto of a flux direction indicator, which visibly indicates the direction of the flux and which may also define the outline of the permanent magnet to be processed. In order to change the regular flux pattern of the magnetic field to that of a predetermined pattern, when using the bi-polar electromagnet type of magnetizing devices, it may be necessary to adjust the relative position of the pole cores and thus vary the intensity of the field and the flux pattern, which change in the flux pattern is indicated by the flux direction indicator, and then vary the permeability of portions of the field by adding pieces of magnetic material thereinto at various places to change the path of the lines of force to conform to the outline of the permanent magnet, as defined by the magnetic flux indicator. When using the solenoid type of magnetizing devices, it may be necessary to reshape portions of the solenoid to produce the proper flux pattern.

Two embodiments of flux direction indicators used to ascertain the direction of the magnetic field of the magnetizing apparatus have been illustrated. The flux direction indicator 15 (Figs. 1 and 2) is a flat rectangularly shaped unit and comprises a plurality of T-shaped indicating members 17 having elongated rod-shaped indicating portions 18 of magnetic material mounted for rotation about the axis of stem portions 19 of non-magnetic material joined thereto intermediate their ends. The stem portions 9 of the indicating member 17 fit into apertures 21—21 formed in a non-magnetic mounting plate 22 and the ends thereof bear against a non-magnetic backing plate 24 engaging the plate 22. A transparent non-magnetic retaining plate 25 is positioned in spaced relation to the indicating members 17 and the plates 22, 24 and 25 are secured together in assembled relation by a plurality of bolts, nuts and spacers 27, 28 and 29, respectively. The apertures 21 in plate 22 are arranged in a series of rows with the apertures 21 of one row staggered with respect to the apertures of the adjacent rows so that the apertures 21 are spaced equi-distant from adjacent apertures. Thus the indicating members 17 positioned therein are spaced equi-distant from the adjacent members and are mounted for free rotation about parallel axes and with their indicating portions 18 disposed substantially in a plane.

The flux direction indicator 15 may be brought into various parts of the magnetic field of a magnetizing apparatus to ascertain the direction of the flux thereof. The indicator may be held in any suitable position, horizontally, vertically, or at an angle, and the indicating members 17 thereon will become temporarily magnetized and arrange themselves to indicate the direction of the magnetic field. As the flux direction indicator is moved from one position to another in the magnetic field, the members 17 change their positions to indicate the change in direction of the lines of flux. The arrangement of the indicating members 17 is visible through the transparent retaining plate 25 of the indicator 15 so that the direction of the lines of force is easily discernible.

The portions 18 of the indicating members 17 are of a predetermined length and are spaced relative to the portions 18 of adjacent member 17 so as to provide air gaps therebetween of sufficient reluctance to prevent magnetic induction from one to the other of the members. Thus, the indicating members are merely magnetic responsive members which align themselves in the magnetic field to visibly indicate the paths of magnetic lines of force without being influenced magnetically by adjacent members and without substantially changing the magnetic field in which they are positioned.

Any suitable permanent magnetic, electromagnet or solenoid may be used for processing the permanent magnets. The electromagnet 35 illustrated in Fig. 5 comprises a pair of coils 36 and 37 mounted on magnetic cores 38 and 39, which are secured to brackets 40 and 41 carried by the plate 42. The core members 38 and 39 are disposed at an angle and terminate in poles provided with vertical faces 44 and 45 and horizontal faces 46 and 47, on which the specimens to be processed may be mounted. The pole pieces are movable relative to each other to vary the magnetic field. As shown, the bracket 41 is slidably mounted on the plate 42 and is adjusted thereon by an adjusting screw 49 mounted for rotation in a base member and threadedly engaging a stud 50 projecting from the bracket 41 through a slot in the plate 42. When the electromagnet 35 is energized, a magnetic field of conventional pattern, as indicated by the dotted lines 51, is produced between the pole cores which may be explored and its pattern ascertained by inserting the flux direction indicator 15 therein.

When using the electromagnet 35 to process a horn-type pole 52 of the permanent magnet unit 53, illustrated in Fig. 6, the flux pattern of the magnetic field thereof should be changed to conform to the shape of the horn-type pole in order to obtain the optimum magnetic properties in the permanent magnet. The flux indicator 15 is inserted into the magnetic field of the electromagnet 35 and the flux pattern is explored to determine which part of the field most nearly conforms to the shape of the specimen. To facilitate the exploration, the outline of the horn-type pole may be drawn in crayon on the plate 25 of the flux indicating member 15 or the general outline of the pole piece relative to the indicator 15 may be retained mentally. The pole piece 39 may be adjusted relative to the pole piece 38 to vary the magnetic field therebetween until a flux pattern is attained which conforms in part to the outline of the horn-type magnet, or which appears to be suitable for the next step in the modifying of the flux pattern. This condition is similar in part to that illustrated in Fig. 7, wherein the flux direction indicator 15, with the outline 55 of the permanent magnet to be processed drawn thereon, is positioned on the horizontal surface of the pole core 39 and wherein the right end portion of the outline 55 of the specimen conforms generally to the pattern of the flux, as indicated by the individual indicating members 27 of the flux direction indicator 15. To have the direction of the flux conform to the lefthand portion of the outline 55 of the specimen indicated on the indicator 15, it is necessary to change the flux pattern of the conventional flux field of the electromagnet 35, which is accomplished by adding pieces of magnetic material into portions of the magnetic field to vary the permeability of portions of the field and thus to change the path of flux until the desired pattern is obtained. By the addition of a block of magnetic material or auxiliary pole piece 57, the desired flux pattern is obtained for the lefthand portion of the outline 55 representing the permanent magnet pole 52 to be processed. Thus it will be apparent that the magnetic field of the electromagnet 35 with the pole pieces spaced apart, as shown in Fig. 7, and provided with the auxiliary pole piece 57, provides a flux pattern the direction of which conforms to the shape of the horn type pole 55 marked on the indicator 15. Non-magnetic supporting members 58 and 59 may be secured to the pole pieces 38 and 39, respectively, to position and hold the horn type magnet during the magnetizing operation. Current to the electromagnets may be varied to produce the desired intensity of flux which may be measured by any suitable means, for example, by a flux meter (not shown).

It will be seen that a method and apparatus has been devised in which the regular flux pattern of a magnetic field has been changed to provide a predetermined flux pattern conforming to the shape of a permanent magnet to be processed therein when supported in a predetermined position in the magnetic field. With the correct predetermined flux pattern established in the magnetizing apparatus and with a permanent magnet placed in the proper predetermined position therein to cool after having first been heated to the proper temperature, the magnetic lines of force, which conform to the shape of the permanent magnet and pass therethrough, act to stress the molecules therein as they become magnetic, producing the optimum magnetic properties in the permanent magnet.

In order to magnetize a U-shaped or horseshoe type magnet 66, as illustrated in Fig. 9, the regular magnetic field of the electromagnet 35 is modified to conform to the shape of the permanent magnet by the addition of parts as shown in Figs. 10 and 11 and with the aid of the flux direction indicator 65 illustrated in Figs. 3 and 4.

The flux direction indicator 65 is shaped to conform to the outline of the horseshoe type magnet 66 (Fig. 9), which is to be processed, and comprises a plurality of T-shaped flux direction indicators 67 (Figs. 3 and 4) mounted on a flat, U-shaped, non-magnetic supporting member 68. The indicators 67 comprise straight indicating portions 69 of magnetic material secured midway between their ends to the ends of supporting pins 70 of non-magnetic material rotatably mounted in apertures 71 in the member 68. The indicating members 67 are arranged in two rows, one along each margin of the U-shaped member 68, and the pins 70 are provided with heads 72 to retain the indicating members 67 on the plate 68. To prevent magnetic induction from one to the other of the members 69, the members 67 are spaced apart a distance to provide an air gap of sufficient reluctance therebetween.

In order to set up the electromagnet 35 to magnetize the U-shaped magnet 66, the flux direction indicator 65 is used and, with the indicator 65 in the magnetic field, the pole pieces 38 and 39 are adjusted relative to each other to produce a flux intensity and pattern most suitable for the shape of the magnet to be magnetized. The intensity of the flux may be measured by any suitable means and the current to the electromagnet 35 varied to insure that the magnitude of the flux is sufficient for the purpose.

The magnetic flux pattern may not conform to the shape of the indicator 65, but may cut across various portions of it and will have to be further modified to make it conform to the shape of the indicator. A bar of magnetic material 75 may be positioned above the indicator 65 to direct or shunt a portion of the field around it. Other flux directing members 76 and 77 may be added to the member 75 and positioned on opposite sides of the indicator 65 in spaced relation to the pole pieces 38 and 39, as shown in Figs. 10 and 11. The magnetic members 75, 76 and 77 are secured together and serve to shunt and direct the magnetic lines of force into a path more nearly conforming to the shape of the indicator 65 and are supported by non-magnetic supporting strips 78 and 79. To deflect the magnetic lines of force upwardly into the interior of the U-shaped indicator 65, auxiliary pole pieces 80 and 81 are provided and are secured to the poles 38 and 39, respectively, of the electromagnet 35. The shape and position of the magnetic members 75, 76, 77, 80 and 81 are determined empirically and, when proportioned and positioned as shown in Figs. 10 and 11, form a flux directing means for producing a magnetic field having a flux pattern conforming substantially to the outline of the U-shaped flux direction indicator 65 and the permanent U-shaped magnet 66, as indicated in Figs. 10 and 11. The magnetic members 75, 76 and 77, with their non-magnetic supports 78 and 79, form a movable unit 80, which is removed from the magnetic field prior to the positioning of a magnet 66 therein so that after a magnet 66 has been heated and positioned in the magnetic field, the upper flux deflecting unit 80 is placed in position around the magnet, as indicated in Fig. 11. The magnet 66 then proceeds to cool and is subjected to the stress of the magnetic flux, which conforms in direction to the shape of the magnet.

To magnetize U-shaped magnets having relatively long legs, it has been found advantageous to use the solenoid type of magnetizing device illustrated in Figs. 12 and 13. The solenoid 90 comprises a hollow coil bent in the middle and folded on itself to form two parallel hollow coil portions 91 and 92 for receiving the straight leg portions of a magnet 95 therein. The conductor from which the solenoid is formed is a metal tube to permit the circulation of cooling liquid therethrough and, if desired, may be covered with an insulating coating. Simulating the U-shaped magnet 95 to be processed, a U-shaped flux indicating device 165, similar to the flux indicating device 65, and having a plurality of freely rotatable magnetic flux indicating members 167 mounted thereon, is inserted in the solenoid 90, as illustrated in Fig. 12, to determine the flux pattern of the magnetic field therein. The flux pattern of the lower portion of the solenoid 90 conforms to the straight portions of the magnet 95, as indicated by the members 167, of the flux indicating member 165. In order to make the flux pattern of the upper portion of the solenoid conform to the rounded portion of the magnet 95, as represented by the corresponding portion of the flux direction indicator 165, the upper turns of the solenoid coils are deformed and inclined upwardly and outwardly, as indicated in Figs. 12 and 13. The magnetomotive force of the upper turns of the solenoid produce a magnetic field, the lines of force of which are directed obliquely toward each other which, together with their horizontal components, form a flux pattern conforming to the shape of the round portion of the magnet, as indicated by the indicating members 167 of the flux direction indicator 165 (Fig. 12). The upper turns of the coils of the solenoid 90, in addition to being obliquely positioned to produce the proper flux pattern, are enlarged so as to provide clearance for the insertion and removal of the U-shaped magnets 95 relative to the solenoid 90. Any suitable means may be provided for supporting the permanent magnet 95 in position in the solenoid 90 or the magnet 95 may engage and be supported by portions of the solenoid 90.

In the processing thereof, the magnet 95 is heated to a temperature at which it is non-magnetic and is then withdrawn from the heat and placed within the solenoid 90, as indicated in Fig. 13, and allowed to cool while the lines of force of the magnetic field, which conform to the shape of the magnet and are produced by a current passing through the solenoid, act to stress the molecules of the magnet in the proper direction as they become magnetic.

What is claimed is:

1. A method of producing a proper flux pattern of a magnetizing fixture to magnetize permanent magnets which comprises establishing a magnetic field, providing a flux direction indicator simulating the shape of the permanent magnet to be magnetized, exploring the flux pattern of the magnetic field with the flux direction indicator to ascertain the position where the flux most nearly conforms to the shape represented by the indicator, adjusting the length of said magnetic field to change the flux pattern to one conforming more nearly to the shape of the permanent magnet to be magnetized, and altering the reluctance of portions of the magnetic field to further change the flux pattern to conform to the shape of the permanent magnet to be magnetized.

2. A method of producing the proper flux pattern of a magnetizing fixture to magnetize permanent magnets which comprises establishing a magnetic field, providing a flux direction indicator simulating the shape of the permanent magnet to be magnetized, exploring the flux pattern of the magnetic field with the flux direction indicator to ascertain the position where the flux most nearly conforms to the shape represented by the indicator, adjusting the length of the magnetic field to change the flux pattern to one conforming more nearly to the shape of the permanent magnet to be magnetized, adding magnetic material into the magnetic field to further change the flux pattern to conform to the shape of the permanent magnet to be magnetized, and providing for supporting the permanent magnet in said position in the magnetic field where the magnetic flux pattern conforms to the shape of the permanent magnet to be magnetized.

3. A method of producing the proper flux pattern of a magnetizing fixture to magnetize a part having a predetermined shape which comprises providing a magneto-motive force for establishing a magnetizing field having a flux pattern conforming in part to the shape of the part to be magnetized, fashioning a flux direction indicator to conform to the configuration of said part, introducing said flux direction indicator in a predetermined position in said magnetizing field to indicate the flux pattern of the area occupied by said indicator, and changing the direction of a portion of the magneto-motive force to change the direction of a portion of the magnetic flux to conform substantially to the shape of said area defined by said indicator.

4. A method of producing the proper flux pattern of a fixture for magnetizing an element having a predetermined shape which comprises establishing a magnetic field, exploring said field to locate an area conforming in shape to said element and having a flux pattern conforming in part to said area, changing the length of the magnetic field to alter the flux pattern thereof to more nearly conform to said area, and changing the permeability of portions of the magnetic field outside of said area to further change the flux pattern in said area to more nearly conform to the shape of said area and said element.

5. A method of producing the proper flux pattern of a magnetizing fixture to magnetize permanent magnets, which comprises establishing a magnetic field, forming a magnetic flux direction indicator to conform to the configuration of said permanent magnet, exploring the magnetic field with said flux direction indicator to locate an area therein similar to the configuration of said permanent magnet and having a flux pattern most nearly conforming thereto, and altering the permeability of portions of the magnetic field outside of said area to change the path of flux of said area to conform to the shape of the permanent magnet to be magnetized.

6. A method of providing the proper flux pattern of a solenoid magnetizing fixture to magnetize a permanent magnet, which comprises shaping the solenoid to provide a magnetic field having a flux pattern conforming in part to the shape of the permanent magnet, forming a flux direction indicator to conform to the configuration of said permanent magnet, introducing said flux direction indicator in a predetermined position in said magnetizing field to indicate the flux pattern of the area occupied by said indicator, and changing the position of a portion of the solenoid to alter the direction of a portion of the magnetic flux to conform substantially to the shape of the area defined by said indicator.

7. A method of producing a proper flux pattern of a magnetizing fixture to magnetize permanent magnets, which comprises establishing a magnetic field, forming a magnetic flux direction indicator which discloses the configuration of said permanent magnet, exploring the magnetic field with the flux direction indicator to locate an area therein similar to the configuration of said permanent magnet and having a flux pattern most nearly conforming thereto, and adding magnetic material in the magnetic field outside of said area to change the flux pattern of said area to conform to the shape of the permanent magnet.

EMERSON PUGH.

REFERENCES CITED

The following references are of record in the file of this patent:

UNITED STATES PATENTS

| Number | Name | Date |
| --- | --- | --- |
| 1,460,759 | Kuhn-Frei | July 3, 1923 |
| 2,248,272 | Jurak | July 8, 1941 |
| 2,272,766 | Corson et al. | Feb. 10, 1942 |
| 2,277,431 | Fitch | Mar. 24, 1942 |
| 2,392,168 | Mages | Jan. 1, 1946 |
| 2,394,152 | Coon | Feb. 5, 1946 |

OTHER REFERENCES

Magnets, Underhill, first edition, McGraw-Hill Book Company, Inc., pages 316–326.